(12) United States Patent
Nakamura et al.

(10) Patent No.: US 6,415,371 B1
(45) Date of Patent: Jul. 2, 2002

(54) STORAGE SYSTEM, STORAGE DEVICE, STORAGE MEDIUM CONTROLLER, ACCESS DEVICE, METHOD FOR PROTECTING DATA, STORAGE MEDIUM AND COMPUTER DATA SIGNAL

(75) Inventors: Yasuhiro Nakamura, Tokyo; Hideko Ueno, Iwate; Era Satoshi, Hokkaido, all of (JP)

(73) Assignees: Tokyo Electron Device Limited; B.U.G., Inc., both of (JP)

( * ) Notice: Subject to any disclaimer, the term of this patent is extended or adjusted under 35 U.S.C. 154(b) by 0 days.

(21) Appl. No.: 09/514,992

(22) Filed: Feb. 29, 2000

(30) Foreign Application Priority Data

Mar. 2, 1999 (JP) ............................................ 11-054725

(51) Int. Cl.[7] ................................................ H04L 9/00
(52) U.S. Cl. .................... 711/164; 711/152; 711/163; 713/2; 713/150; 713/160; 713/168
(58) Field of Search .................. 711/152, 163, 711/164; 713/150, 2, 160–162, 168, 171, 175, 189, 190

(56) References Cited

U.S. PATENT DOCUMENTS

| | | | | |
|---|---|---|---|---|
| 5,212,729 A | * | 5/1993 | Schafer | 380/26 |
| 5,796,825 A | * | 8/1998 | McDonnal et al. | 380/29 |
| 6,061,449 A | * | 5/2000 | Candelore et al. | 380/28 |
| 6,158,004 A | * | 12/2000 | Mason et al. | 713/200 |
| 6,266,754 B1 | * | 7/2001 | Laczko, Sr. et al. | 711/203 |

* cited by examiner

Primary Examiner—Than Nguyen
(74) Attorney, Agent, or Firm—Luce, Forward, Hamilton & Scripps

(57) ABSTRACT

When a storage section is installed in a controller and the controller is installed in an access device, the controller reads out device ID data and CIS data from the storage section, and certifies the storage section based on the device ID data and the CIS data. Upon completion of the certification of the storage section, the controller reads out boot data and a code key therefrom, and supplies the access device with the read boot data and code key. Subsequently, the access device decodes general data read out from the storage section via the controller, using the code key, and encodes data to be stored using the code key, and writes the encoded data in the storage section via the controller.

22 Claims, 7 Drawing Sheets

STORAGE SYSTEM, STORAGE DEVICE, STORAGE MEDIUM CONTROLLER, ACCESS DEVICE, METHOD FOR PROTECTING DATA, STORAGE MEDIUM AND COMPUTER DATA SIGNAL

BACKGROUND OF THE INVENTION

1. Field of the Invention

The present invention relates to a storage system using a storage medium, a storage device, an access device, a storage medium controller and a method for protecting data, and, more particularly, to a storage system for encoding data and storing the encoded data, a storage device, an access device, a storage medium controller and a method for protecting data.

2. Description of the Related Art

As storage mediums which are accessible by computers or the like (i.e., mediums from and onto which data is read, written and erased), a hard disk drive, an MO (Magneto-Optical disk) and a flash memory are known. Such storage mediums are utilized for the purpose of storing data and transferring data between a plurality of computers.

In order to protect data stored on such storage mediums from any access which is not permitted, conventionally, data has been stored after being encoded.

Generally speaking, data to be stored on a storage medium includes boot data showing conditions to access the storage medium (e.g., parameters representing the structure of a storage area within the storage medium, or parameters for designating a process or a speed for and at which data is to be read and written).

Hence, in order to access such a storage medium, the boot data needs to be decoded first. Those computers for accessing the storage medium has to prepare in advance a code key or the like for use in decoding the boot data.

A function for analyzing the contents of the boot data and accessing the storage medium in accordance with an analyzed result may be provided within an operating system (OS). In such a case, however, there is required a process, which is quite complicated, for acquiring the boot data, which has been encoded without going through the function included in the OS, and supplying the OS with the decoded boot data.

SUMMARY OF THE INVENTION

The present invention has been made in consideration of the above, and it is accordingly an object of the present invention to provide a storage system, a storage device, a storage medium controller, an access device and a method for protecting data, so that stored data is so encoded as to be protected and that the encoded data can be accessed in accordance with an easy process.

In order to achieve the above object, according to the first aspect of the present invention, there is provided a storage system comprising:

a storage medium and an access device, and wherein the storage medium includes a storage area for storing code data representing encoded data, a code key for use in decoding the code data and in creating the code data, and boot data representing in plaintext form a condition to access the storage medium, and the access device obtains the boot data and the code key from the storage medium, obtains the code data from the storage medium in accordance with the condition represented by the obtained boot data, and decodes the obtained code data using the obtained code key, and creates code data by encoding data to be stored on the storage medium with utilization of the obtained code key, and stores on the storage medium the created code data in accordance with the condition represented by the obtained boot data.

In the storage system having the above structure, the access device prepares the conditions in which the code data can be accessed simply by obtaining the boot data in the plaintext form. Hence, the data stored on the storage medium is protected simply being encoded, and the encoded data can be accessed in accordance with an easy process.

The code key stored on the storage medium is not necessarily presented in the plaintext form, thus can be encoded.

The storage medium so stores the code key and the boot data as not to substantially be rewritten. Accordingly, such a coed key and boot data are prevented from being updated by any means which is not permitted to do so, thereby satisfactory ensuring the confidentially of the encode data.

The storage system may further comprise a storage medium controller which controls the storage medium to be removably installed in the controller and which is removably installed in the access device.

In this case, the storage medium controller may obtain the code data from the storage medium and supplies the access device with the obtained coded, in response to a read instruction which is sent from the access device, obtain from the access device the coded data which the access device has created, and stores the code data on the storage medium, in response to a write instruction which is sent form the access device, and the access device may provide the storage medium controller with the read instruction to obtain the code data from the storage medium in accordance with the condition represented by the boot data, and request the storage medium controller for storing the created code data on the storage medium in accordance with the condition represented by the boot data.

Accordingly, the storage medium satisfactorily functions independently or in a state in which it is installed in the storage medium controller. This enhances the portability of the storage medium. The process to be performed by the access device can be simplified, if the access device accesses the storage medium through the storage medium controller.

The storage medium controller may store certification data representing at least one piece of proper boot data, determine whether the stored certification data coincides with the boot data stored on the storage medium, and, when determined that the stored certification data does not coincide therewith, substantially reject the read and write instructions sent from the access device.

The storage medium may store ID data for identifying itself. In this case, the storage medium controller may determine the storage medium is a proper medium based on the ID data supplied from the storage medium, and, when determined that the storage medium is not a proper medium, substantially rejects the read and write instructions sent from the access device.

In this structure, the access device is prevented from obtaining data from an improper storage medium, and the data on the storage medium is prevented from being copied by any means which is permitted to do so. This ensures the desired confidentiality of the data. Furthermore, the access device is prevented from being infected with a computer virus.

The storage medium so stores the ID data substantially as not to substantially be rewritten. This ensure the confidentiality of the data, and this prevents any unauthorized data from accessing the access device.

According to the second aspect of the present invention, there is provided a storage device comprising means for storing code data representing encoded data, a code key for use in decoding the code data and in creating the code data, and boot data showing in a plaintext form a condition to access the storage device, wherein the device sends the code data to an external device which obtains the boot data and the code key from itself and which requests for reading the code data in accordance with the conditions represented by the boot data, and obtains data to be written and stores the data from the external device which obtains the boot data and the code key from itself and, which requests for writing code data to be written in accordance with the condition represented by the boot data.

Such a storage device accepts any access directed to code data from the external device which has obtained the boot data. Hence, the data stored on the storage device is so encoded so as to be produced, and the encoded data can be accessed in accordance with a simple process.

The code key which the storage device itself stores is not necessarily represented in the plaintext form, and can be encoded.

The storage device so stores the code key and the boot data substantially as not to be rewritten. Accordingly, the code key and the boot data are prevented from being updated by any means which is not permitted to do so, thereby ensuring the confidentiality of the code data.

The storage device may store ID data for identifying itself, and supply, with the ID data, the external device which requests for reading and/or writing the code data.

In this structure, the external device performs identifying the storage device based on the ID data, thereby the access device is prevented from obtaining data from any inappropriate storage medium and the data stores on the storage medium is prevented from undesirably copied. This ensure the desired confidentiality of the data, and this also prevents the access device from being infected with a computer virus.

In this case, the storage device so stores the ID data substantially as not to be rewritten. The ID data is prevented from being rewritten in an inappropriate manner, and the confidentiality of the data can be highly achieved. In addition, any unauthorized data, such as any unwanted computer virus or the like, is prevented from entering the access device.

According to the third aspect of the present invention, there is provided a storage medium controller, which is removably installed in a storage medium having a storage area for storing:
  ID data for identifying itself,
  code data representing encoded data,
  a code key used in decoding the encoded data and in creating the code data, and
  boot data representing in a plaintext form a condition to access the storage medium, and
which is removably installed in an access device which
  obtains the boot data and the code key from the storage medium,
  obtains the code data from the storage medium in accordance with a condition represented by the obtained boot data,
  decodes the obtained code data using the obtained code key,
  creates code data by encoding with the obtained code key data to be written on the storage medium, and
  stores on the storage medium the created code data in accordance with the condition represented by the obtained boot data, and the controller comprising:
    an output circuit which obtains the code data from the storage medium and supplies the access device with the obtained data, in response to a read instruction, to obtain the code data from the storage medium in accordance with the condition represented by the boot data, which is supplied from the access device;
    an input circuit which obtains from the access device the code data created by the access device and which stores the code data on the storage medium in response to a write instruction, to store on the storage medium the code data created by the access device in accordance with the condition represented by the boot data, which is supplied from the access device; and
    a determination circuit which determines whether the storage medium is a proper medium based on the ID data supplied from the storage medium, and, when determined that the storage medium is not a proper medium, substantially prevents the output and input circuits to respond to the read and write instructions.

According to the fourth aspect of the present invention, there is a provided storage medium controller which is removably installed in a storage medium including a storage area for storing
  code data representing encoded data,
  a code key for use in decoding the code data and creating the code data, and
  boot data representing in a plaintext form a condition to access the storage medium, and
which is removably installed in an access device which
  obtains the boot data and the code key from the storage medium,
  obtains the code data from the storage medium in accordance with the condition which the obtained boot data represents,
  decodes the obtained code data using the obtained code key,
  creates code data by encoding data to be stored on the storage medium using the obtained code key, and
  stores the created code data on the storage medium in accordance with the condition which the boot data represents, and the controller comprising:
    a memory which stores certification data representing at least one piece of proper boot data; and
  a control circuit which
    obtains the code data from the storage medium and supplies the access device with the obtained code data, in response to a read instruction, which is supplied from the access device, to obtain the code data from the storage medium in accordance with the condition which the boot data represents,
    obtains from the access device the code data created by the access device, in response to a write instruction, which is sent form the access device, to write the created code data on the storage medium in accordance with the condition which the boot data represents, stores the code data on the storage medium in response to the write instruction, and determines whether the stored certification data coincides with the boot data stored on the storage medium, and rejects the read and write instructions sent from the access device, when determined that the stored certification data does not coincide with the boot data stored on the storage medium.

Such an access device being installed in the storage medium controller simply obtains the boot data in the plaintext form via the storage medium controller from the storage medium installed in the storage medium controller, thereby to prepare the conditions in which the code data can be accessed. Thus, the data stored on the storage medium is so encoded as to be protected without being damaged, and the encoded data can be accessed in accordance with a simple process. The storage medium can satisfactorily function independently from any other devices or in a state where it is installed in the storage medium controller, enhancing the portability of the storage medium.

According to the storage medium controller, the storage device can be identified based on the ID data or the boot data. This prevents the access device from obtaining data from any inappropriate storage medium, and the data stored on the medium from being copied by any means which is not permitted to do so. As a result of this the confidentiality of the data can be high achieved, and the access device is protected against any unwanted computer virus.

According to the fifth aspect of the present invention, there is provided an access device comprising:

an input device which obtains boot data and a code key from a storage medium including a storage area for storing code data representing encoded data, a code key for use in decoding the code data and in creating the code data, and the boot data representing in a plaintext form a condition to access the storage medium;

a decoder which decodes the code data using the obtained code key, after obtained the code data from the storage medium, in accordance with the condition which the obtained boot data represents; and an encoder which creates code data by encoding data to be stored on the storage medium using the obtained code key, and which stores the created code data on the storage medium in accordance with the condition which the obtained boot data represents.

Such an access device simply obtains the boot data, thereby preparing the conditions in which the code data stored on the storage medium can be simply accessed. The code data can be accessed in accordance with a simply process.

In such an access device, the boot data in the plaintext form can be acquired, thereafter the encoded data stored on the storage medium can be accessed in accordance with an easy process.

According to the sixth aspect of the present invention, there is provided a method for protecting data, comprising the steps of:

obtaining boot data and a code key which are stored on a storage medium storing the boot data representing, in a plaintext form, code data representing encoded data, the code key for use in decoding the code data and in creating the code data, and a condition to access the code data and the code key;

obtaining the code data in accordance with the condition which the obtained boot data represents, and decoding the obtained code data using the obtained code key; and creating code data by encoding data to be stored with utilization of the code key, and storing on the storage medium the created code data in accordance with the condition which the boot data represents.

According to the method for protecting data, once the boot data in the plaintext form stored on the medium is obtained, the conditions in which the code data can be accessed are thus prepared. The data stored on the medium is so encoded as to be protected, the encoded data is accessed in accordance with a simple process. The code key is not necessarily presented in the plaintext form, instead can be encoded.

The storage medium may store ID data for identifying the storage medium.

In this case, the storage medium may determine whether the storage medium is a proper medium based on the ID data, and substantially reject, when determined that the storage medium is not a proper medium, to obtain the code data from the storage medium and to store the code data on the storage medium.

The method may include the steps of:

storing certification data representing at least one piece of proper boot data; and determining whether the certification data coincides with the boot data stored on the storage medium, and substantially rejecting, when determined that the certification data does not coincide therewith, to obtain the code data from the storage medium and to store the code data on the storage medium.

According to this structure, any data stored on an inappropriate storage medium can be prevented from being read out, and the data on the storage medium can be prevented from copied by any means which is not permitted to do so. As a result of this, the confidentiality of the data is highly achieved, and unwanted data such as a computer virus or the like is prevented.

According to the seventh aspect of the present invention, there is provided a computer readable storage medium which stores a program for controlling a computer, which is removably installed in a storage medium including a storage area for storing ID data for identifying the storage medium, code data representing encoded data, a code key for use in decoding the code data and in creating the code data, and boot data representing a condition to access the storage medium, and which is removably installed in an access device, which obtains the boot data and the code key from the storage medium, obtains the code data from the storage medium in accordance with the condition represented by the obtained boot data, decodes the obtained code data using the obtained code key, creates code data by encoding data to be stored on the storage medium with utilization of the obtained code key, and stores the created code data on the storage medium in accordance with the condition represented by the obtained boot data, and the program controlling the computer to function as:

an output circuit which obtains the code data from the storage medium and supplies the access device with the obtained code data, in response to a read instruction, which is sent from the access device, to obtain the code data from the storage medium in accordance with the condition represented by the boot data;

an input device which obtains from the access device the code data created by the access device, when the access device supplies the input device with a write instruction to store the created code data on the storage medium in accordance with the condition represented by the boot data, and which stores the code data on the storage medium in response to the write instruction; and a determination circuit which determines whether the storage medium is a proper medium based on the ID data sent from the storage medium, and, when determined that the storage medium is not a proper medium, substantially prevents the output and input circuits is respond to the read and write instructions.

According to the eighth aspect of the present invention, there is provided a computer data signal embodied in a carrier wave and representing a program for controlling a computer, which is removably installed in a storage medium including a storage area for storing ID data for identifying the storage medium, code data representing encoded data, a code key for use in decoding the code data and in creating the code data, and boot data representing in a plaintext form a condition to access the storage medium, and which is removably installed in an access device which obtains the boot data and the code key from the storage medium, obtains the code data form the storage medium in accordance with the condition represented by the obtained boot data, decodes the obtained code data using the obtained code key, creates code data by encoding data to be stored on the storage medium with utilization of the obtained code key, and stores the created code data on the storage medium in accordance with the condition represented by the obtained boot data, and the program controlling the computer to function as:

an output circuit which obtains the code data from the storage medium and supplies the access device with the obtained code data, in response to a read instruction, which is sent from the access device, to obtain the code data from the storage medium in accordance with the condition represented by the boot data;

an input circuit which obtains from the access device the code data created by the access device, when the access device supplies the input device with a write instruction to store the created code data on the storage medium in accordance with the condition represented by the boot data, and which stores the obtained code data on the storage medium in response to the write instruction; and a determination circuit which determines whether the storage medium is a proper medium based on the ID data sent from the storage medium, and, when determined that the storage medium is not a proper medium, substantially prevents the input and output circuits to respond to the read and write instructions.

According to the ninth aspect of the present invention, there is provided a computer readable storage medium storing a program for controlling a computer, which is removably installed in a storage medium including a storage area for storing code data representing encoded data, a code key for use in decoding the code data and in creating the code data, and boot data representing in a plaintext form a condition to access the storage medium, and which is removably installed in an access device which obtains the boot data and the code key from the storage medium, obtains the code data from the storage medium in accordance with the condition represented by the boot data, decodes the obtained code data with utilization of the obtained code key, creates code data by encoding data to be stored on the storage medium with utilization of the obtained code key, and stores the created code data on the storage medium in accordance with the condition represented by the boot data, and the program controlling the computer to function as:

a memory which stores certification data representing at least one piece of proper boot data; and a controller circuit which obtains the code data from the storage medium and supplies the access device with the obtained code data, in response to a read instruction, which is sent from the access device, to obtain the code data from the storage medium in accordance with the condition represented by the boot data, obtains from the access device the code data created by the access device, when the access device supplies the controller with a write instruction to store the created code data on the storage medium in accordance with the condition represented by the boot data, stores the code data on the storage medium in response to the write instruction, and substantially rejects the read and write instructions from the access device when determined that the certification data does not coincides with the boot data stored on the storage medium.

According to the tenth aspect of the present invention, there is provided a computer data signal embodied in a carrier wave and representing a program for controlling a computer, which is removably installed in a storage medium including a storage area for storing code data representing encoded data, a code key for use in decoding the code data and in creating the coded data, and boot data representing in a plaintext form a condition to access the storage medium, and which is removably installed in an access device which obtains the boot data and the code key from the storage medium, obtains the code data from the storage medium in accordance with the condition represented by the obtained boot data, decodes the obtained code data using the obtained code key, creates code data by encoding data to be stored on the storage medium with utilization of the obtained code key, and stores the created code data on the storage medium in accordance with the condition represented by the boot data, and the program for controlling the computer to function as:

a memory which stores certification data representing at least one piece of proper boot data; and a control circuit which obtains the code data from the storage medium and supplies the access device with the obtained code data, in response to a read instruction, which is sent from the access device, to obtain the code data from the storage medium in accordance with the condition represented by the boot data, obtains from the access device the code data created by the access device, when the access supplies the control circuit with a write instruction to store the created code data on the storage medium in accordance with the condition represented by the boot data, stores the code data on the storage medium in response to the write instruction; and substantially rejects, when determined that the certification data does not coincide with the boot data stored on the storage medium, the read and write instructions sent from the access device.

The access device, installed in the computer executing the program stored on the storage medium according to the seventh and ninth aspects of the present invention or executing the program represented by the computer data signal according to the eighth and tenth aspects of the present invention, simply obtains boot data in the plaintext form from the storage medium installed in the computer via the computer, thereby preparing the conditions in which the code data can be accessed. Hence, the data stored on the storage medium is so encoded as to be protected, and the encoded data can be accessed in accordance with an easy process by the access device being lightly loaded. The storage medium can satisfactorily function independently from any other devices or in a static where it is installed in the storage medium controller, enhancing the portability of the storage medium.

According to the eleventh aspect of the present invention, there is provided a computer readable storage medium which stores a program for controlling a computer which is connected to a storage medium including a storage area for storing code data representing encoded data, a code key for use in decoding the code data and in creating the code data, and boot data representing in a plaintext form a condition to access the storage medium, and the program making the computer function as:

an input device which obtains the boot data and the code key from the storage medium;

a decoder which obtains the code data from the storage medium in accordance with the condition represented by the obtained boot data, and which decodes the obtained code data using the obtained code key; and an encoder which creates code data by encoding data to be stored on the storage medium with utilization of the obtained code key, and which stores the created code data on the storage medium in accordance with the condition represented by the obtained boot data.

Accordingly to the twelfth aspect of the present invention, there is provided a computer data signal embodied in a carrier wave and representing a program for controlling a computer which is connected to a storage medium including a storage area for storing code data representing encoded data, a code key for use in decoding the code data and in creating the code data, and boot data representing in a plaintext form a condition to access the storage medium, the program making the computer function as:

an input device which obtains the boot data and the code key from the storage medium;

a decoder which obtains the code data from the storage medium in accordance with the condition represented by the obtained boot data, and which decodes the obtained code data using the obtained code key; and an encoder which creates code data by encoding data to be stored on the storage medium with utilization of the obtained code key, and which stores the created code data on the storage medium in accordance with the condition represented by the obtained boot data.

The computer, executing the program stored on the storage medium or executing the program represented by the computer data signal, obtains boot data in the plaintext form, thereby to prepare the conditions in which the code data stored on the storage medium is accessed. At the same time, the code data can be accessed in accordance with a simple process.

BRIEF DESCRIPTION OF THE DRAWINGS

The object and other objects and advantages of the present invention will become more apparent upon reading of the following detailed description and the accompanying drawings in which.

DETAILED DESCRIPTION OF THE PREFERRED EMBODIMENT

An embodiment of the present invention will now be explained by the example of a memory card system for accessing a memory card having a flash memory, with reference to the accompanying drawings.

Figure 1:
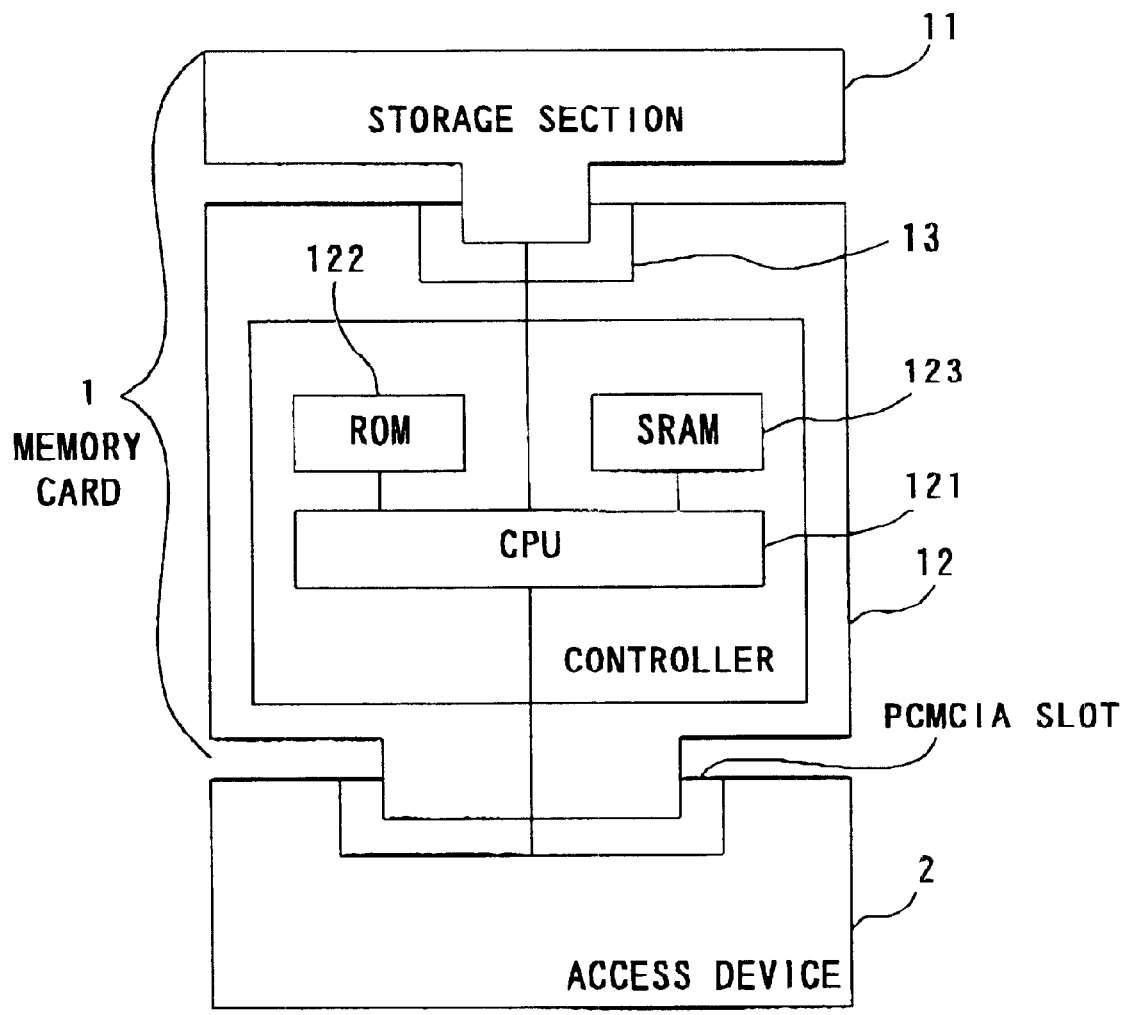
FIG. 1 is a block diagram illustrating the structure of a memory card system according to an embodiment of the present invention.

FIG. 1 is a block diagram illustrating the physical structure of the memory card system according to this embodiment. In the illustration, this memory card system comprises a memory card 1 and an access device 2.

The memory card 1 is removably installed in a slot 13 of the access device 2.

The memory card 1 includes a storage section 11, a controller 12 and the slot 13, wherein the storage section 11 and the controller 12 are connected with each other via the slot 13.

The storage section 11 includes a storage device, such as an EEPROM (Electrically Erasable/Programmable Read Only Memory) or the like, and a logic circuit.

Having received a command to acquire device ID data, from a CPU 121 included in the controller 12, as will be explained later, the logic circuit included in the storage section 11 sends, to the CPU 121, device ID data adopted for use in identifying the storage device 11.

In response to an access from the controller 12, the storage device included in the storage section 11 stores data, which is supplied from the access device 2, provides the access device 2 with the data, and erases the data.

Figure 2:
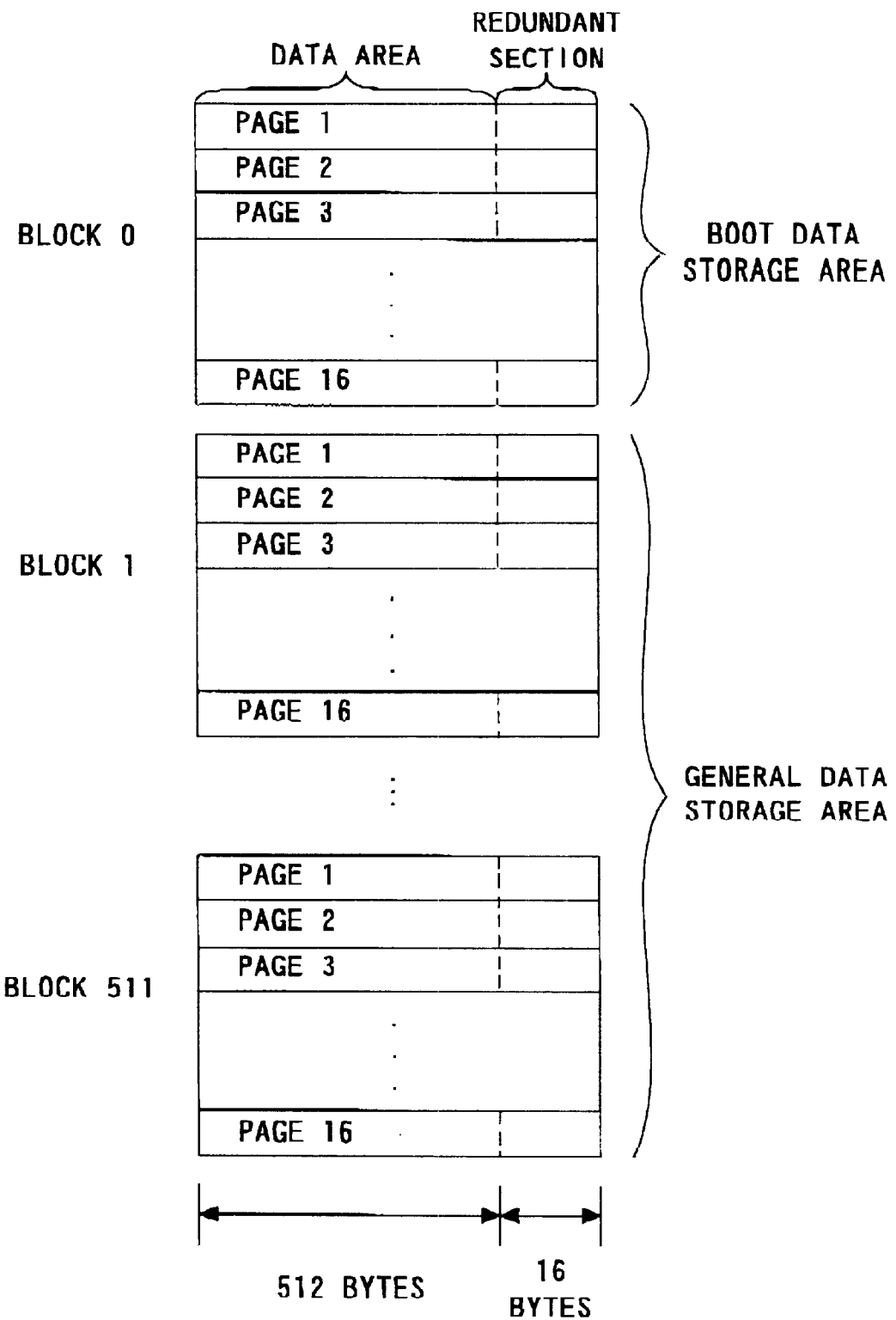
FIG. 2 is a diagram exemplifying the logical structure of storage areas included in a storage section.

Contained in the storage section 11 are storage areas the entire of which are constituted by 8,192 pages, as shown in FIG. 2, for example. Each of the pages has a storage capacity of 528 bytes. Page addresses are respectively affixed to the pages, sequentially numbered from 0 to 8191. Each page contains a plurality of memory cells, to which addresses are respectively given sequentially from 0 to 527.

From the head of 8,192 pages, a unit of 16 pages makes up a single block one by one. Each block has a storage capacity of 8 kilobytes. The storage areas are formed by 512 blocks in its entirety. Further, from the head of the blocks, physical block addresses are respectively given to the entire blocks sequentially from 0 to 511.

As shown in FIG. 2, each of the pages is composed of a data area and a redundant section. From the head of each page, the data areas in the pages are areas containing 512 bytes of data in total, whereas the redundant areas are the areas containing the rest of 16 bytes of data.

Stored in the data area is "intrinsic data". The "intrinsic data" in this case is meant to be the data which is written after sent from the access device 2, or the data which is to be sent to the access device 2. Stored in the redundant area is an error check code, etc. The error check code is data for use in ensuring that the "intrinsic data" suffers no damage.

In addition, stored in the redundant area in each page which belongs to a corresponding block is an LBA (Logical Block Address) value assigned to its block.

The LBA is identified, as an address affixed to a unit of data to be read and written, by the controller 12, at that time data is read and written from and in the storage section 11 in a certain operation, which will be described later.

A predetermined number of, for example, 500 blocks are respectively assigned LBAs. The number of blocks needs to be smaller than the total number of blocks which the storage section 11 physically contains.

Upon reception of an instruction to erase data stored in a certain block, from the controller 12 which is included in the memory card 1, the storage section 11 resets the storage contents stored in the entire memory cells contained in the block. That is, in a case where the storage section 11 is a NAND-type flash memory, it sets as "1" the memory value of each memory cell.

As shown in FIG. 2, of the blocks making up the storage areas of the storage section 11, the head one block forms a boot data storage area. The following blocks, i.e., from the second to the last, forms a general data storage area.

The storage contents stored in the boot data storage area can not substantially be updated by being externally accessed. Thus, the access device 2 and the controller 12 are substantially prohibited from updating the data contents stored in the boot data storage area.

Pre-stored in the boot data storage are boot data, CIS (Card Information Structure) data, a code key. Such data as the boot data, CIS data, a code key are stored therein by a manufacturer of the memory card 1.

The CIS data, the boot data and the code key may be stored sequentially one after another from the head address of addresses making up the boot data storage area.

The CIS data includes parameters of power source data. The power source data is data which represents a recommendation value of a power source voltage to be consumed by the controller 12 in order to access the storage section 11.

A tuple ID, for example, is affixed in front of each of the parameters included in the CIS data. The tuple ID is a given ID code for identifying what each parameter represents. Thus, what each of the parameters represents can be clear by identifying the tuple ID affixed thereto.

The boot data is data with reference to which the access device 2 instructs the memory card 1 whether to read or write general data, in a process explained later. The boot data includes those parameters, which represent the size or the structure of the storage area of the storage section 11, and those parameters, which designate a particular procedure or a speed in accordance with or at which general data is read. Such parameters included in the boot data are stored in order one after another in the boot data storage area. Hence, what those parameters represent or designate can be identified by designating some of head bytes in the boot data storage area.

The code key is a key used by the access device 2 in decoding generated data, which is stored in the general data storage area, in a process described later. In addition to this, such a code key is used by the address device 2 in coding data to be stored as general data in the general data storage area.

Stored in the general data storage area are program data concerning processes, which the access device 2 carries out, or general data. The general data in this case is data with reference to which the access device 2 performs processes.

It should be noted, here, that such general data is stored in a state where the data is coded using the code key stored in the boot data storage area. The encoded general data is then decoded using the code key by the access device 2 after being read thereby.

As shown in FIG. 1, the controller comprises a CPU (Central Processing Unit) 121, a ROM (Read Only Memory) 122 and an SRAM (Static Random Access Memory).

The CPU 121 is connected to the ROM 122, the SRAM 123 and the storage section 11. The CPU 121 is also connected removably to the access device 2 through a PCMCIA slot included in the access device 2.

The CPU 121 includes a logic circuit which carries out a process, which will be explained later, in accordance with program data pre-stored in the ROM 122. Such program data is pre-stored therein by a manufacturer of the controller 12, for example.

The CPU 121 receives commands from the access device 2 and executes the received commands. The commands to be executed by the CPU 121 includes one to access the storage section 11.

The ROM 122 stores the above program data and certification data, which is to represent a particular piece of the CIS data. The program data and the certification data are stored in the ROM 122 in advance by the manufacturer of the controller 12.

The SRAM 123 is a memory used as a working area of the CPU 121. The SRAM 123 stores the CIS data and the boot data which the CPU 121 reads out from the storage section 11. The SRAM 123 also stores a BSI (Block Search Index) and a BPT (Block Pointer Table), which are formed up by the CPU 121 in a process which will be explained later.

Stored in the BSI are data representing which block stored in the storage section 11 is an empty block. What is an "empty block" in this case is a block being in a state of reset. The BSI is formed up by the controller 12 in accordance with a certain process, which will be explained later, and is stored in the SRAM 123.

Figure 3:
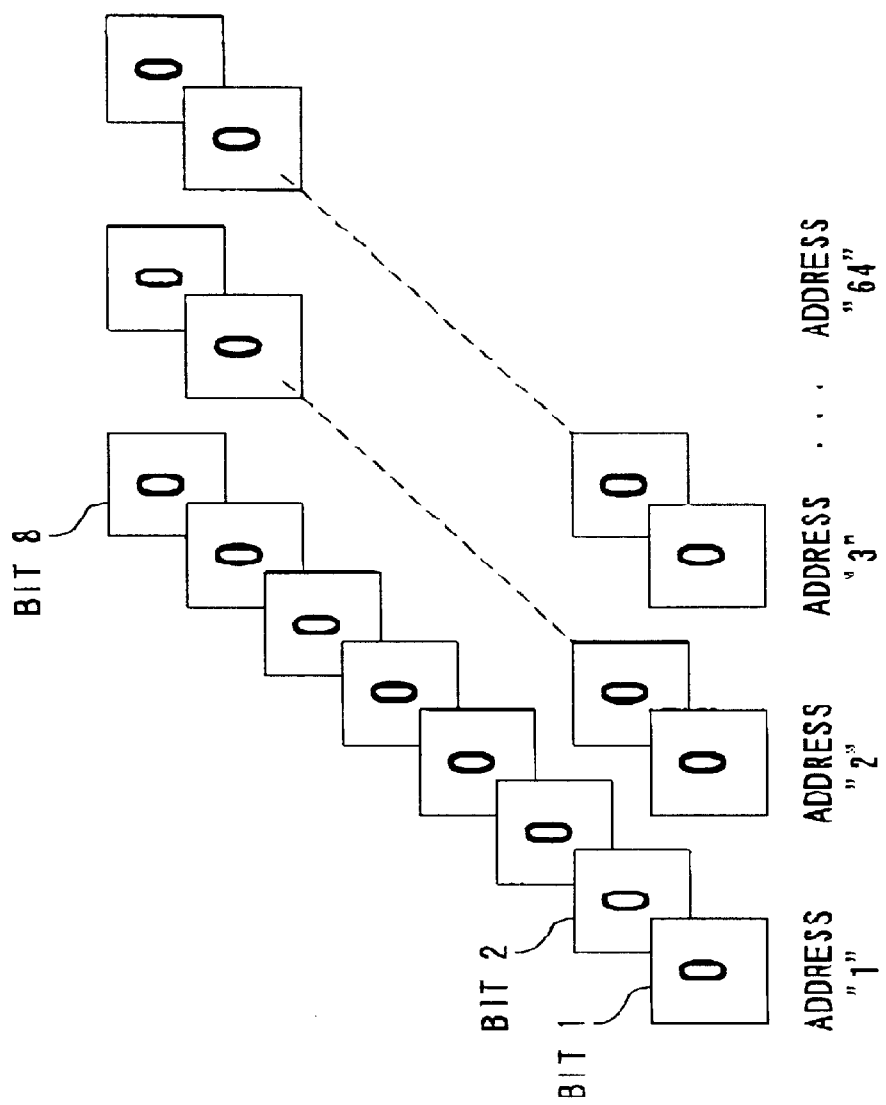
FIG. 3 is a diagram exemplifying the data structure of a BSI (Block Search Index)

FIG. 3 exemplifies the structure of the BSI in the case where the total number of blocks stored in the storage section 11 is 512. In the illustration, the BSI is constituted by data of 64 bytes. The bits, whose total number if 512, forming the BSI sequentially correspond to blocks 0 to 511 one by one. Each bit expresses "1" when its corresponding block is an empty block, and expresses "0" when its corresponding block is not an empty block.

Stored in the BPT are data representing a correlation between LBAs and physical block addresses which will be described later. The BPT is made up every time the BSI is formed, in accordance with a process which will be explained later, and is stored in the SRAM 123. The BPT is stored in a given logical position within a storage area of the SRAM 123.

The BPT has a storage area for storing the physical block addresses respectively corresponding to the LBAs. In particular, the BPT has the data structure exemplified and shown in FIG. 4.

For example, in a case where the total number of the LBAs is 500, the BPT is constituted by 500 words of storage areas. In each storage area, every word, from the head one, is assigned an address. Let it be assumed that such addresses assigned to the words are 1000h to 11F3h. It should be noted that an "h" at the end of a number indicates that the number is a hexadecimal number, in this specification of the present invention.

The value of each address affixed to each of the entire words of storage areas forming the BPT is equal to a sum of its corresponding LBA and an offset value. The offset value in this case is meant to be a minimum value of the addresses affixed to the storage areas constituting the BPT.

The data contents stored in the storage are a corresponding to one word, to which an address is affixed, represents a physical block address of a block corresponding to an LBA indicated by the address.

Figure 4:
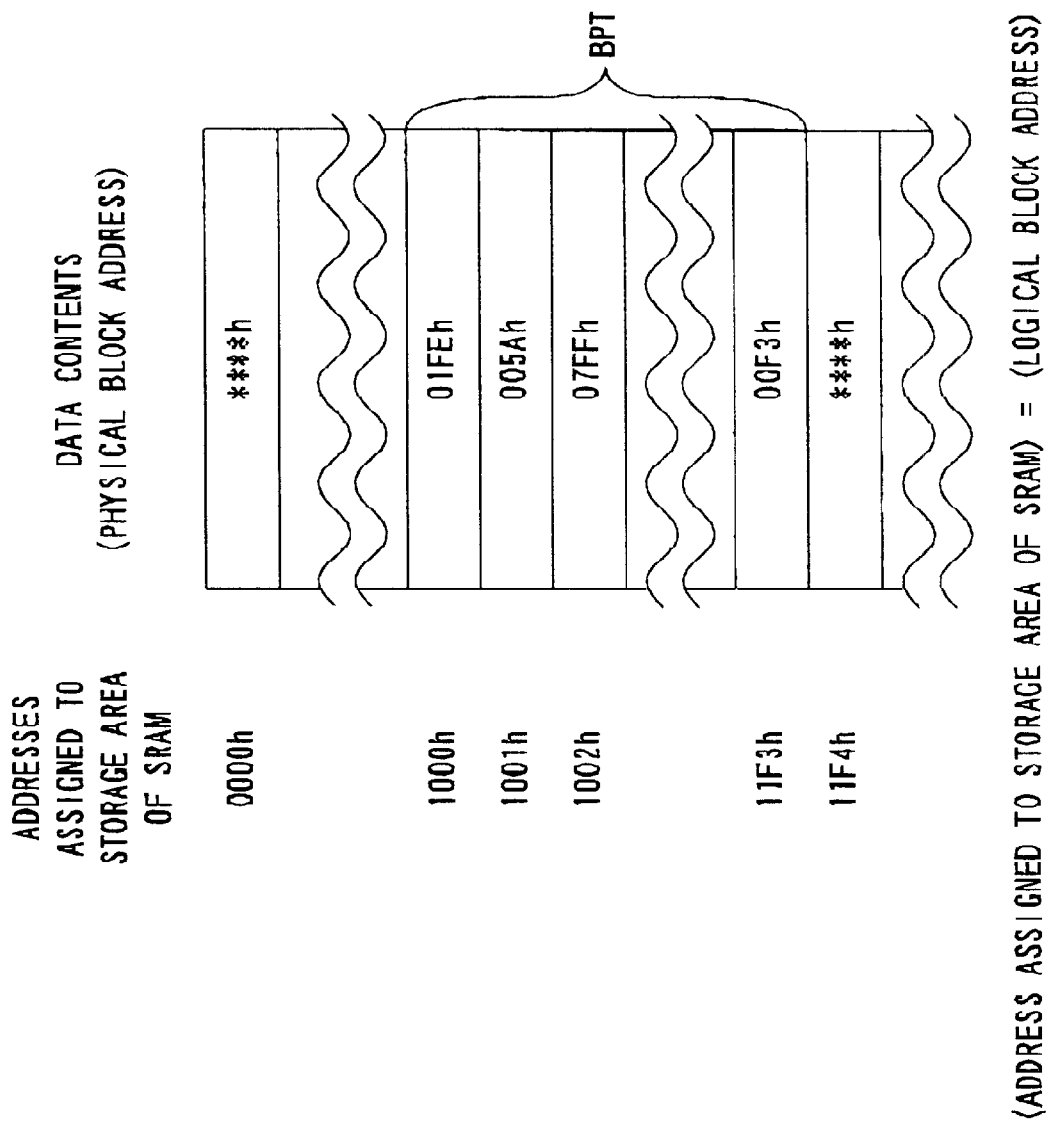
FIG. 4 is a diagram exemplifying the structure of a BPT (Block Pointer Table)

As shown in FIG. 4, particularly, a value "005Ah" is stored in a storage area, to which an address 1001h is affixed. In such a case, if an offset value is set to "1000h", an LBA of "0001h" corresponds to the block whose physical block address is "005Ah".

It should, however, be understood that, in a case where the data contents stored in the storage area, to which a corresponding address is affixed, represents a predetermined value (for example, the value "07FFh", as shown in the illustration), no physical block address corresponds to a block whose LBA is indicated by the address of the storage area storing the above value.

The access device 2 has the above slot, which includes a PCMCIA slot which links to a PCMCIA bus. The access device 2 stores program data representing an OS and a driver, and executes the OS after receiving a power source. When the access device 2 detects that the memory card 1 is installed in the slot, it activates the driver in accordance with a process to be executed by the OS.

The access device 2 executing the process for activating the driver sends to the controller 12 the above-described command to access the storage section 11. The access device 2 supplies the controller 12 with data to be written into the storage section 11. The controller 12 reads the data from the storage section 11, in accordance with the command sent form the access device 2, and supplies the access device 2 with the read data.

Accordingly, the access device 2 accesses the storage section 11 through the controller 12.

(Operations)

Operations of the memory card system according to this embodiment of the present invention will now be explained with reference to FIG. 5.

Figure 5:
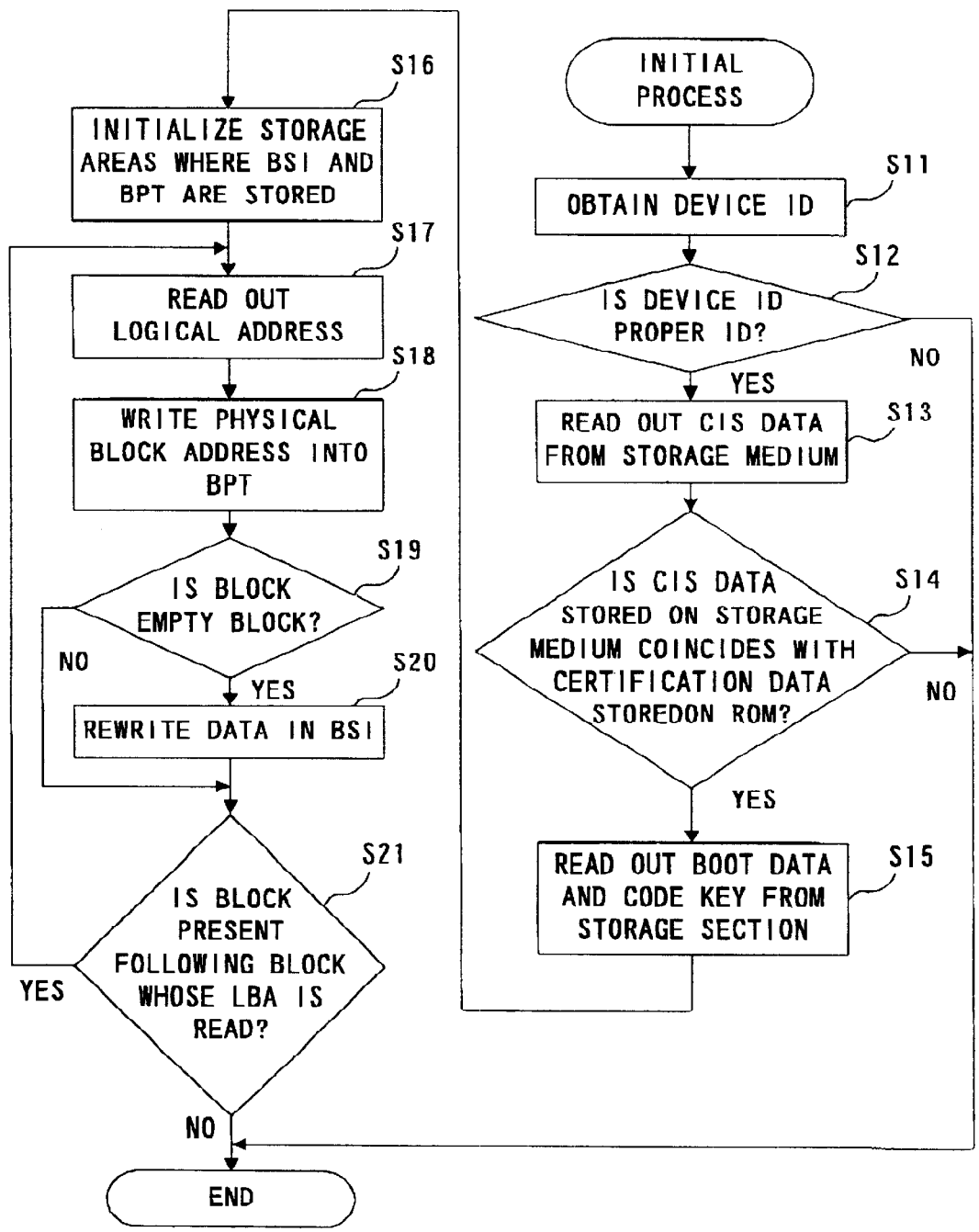
FIG. 5 is a flowchart for explaining an initial process.
Figure 6:
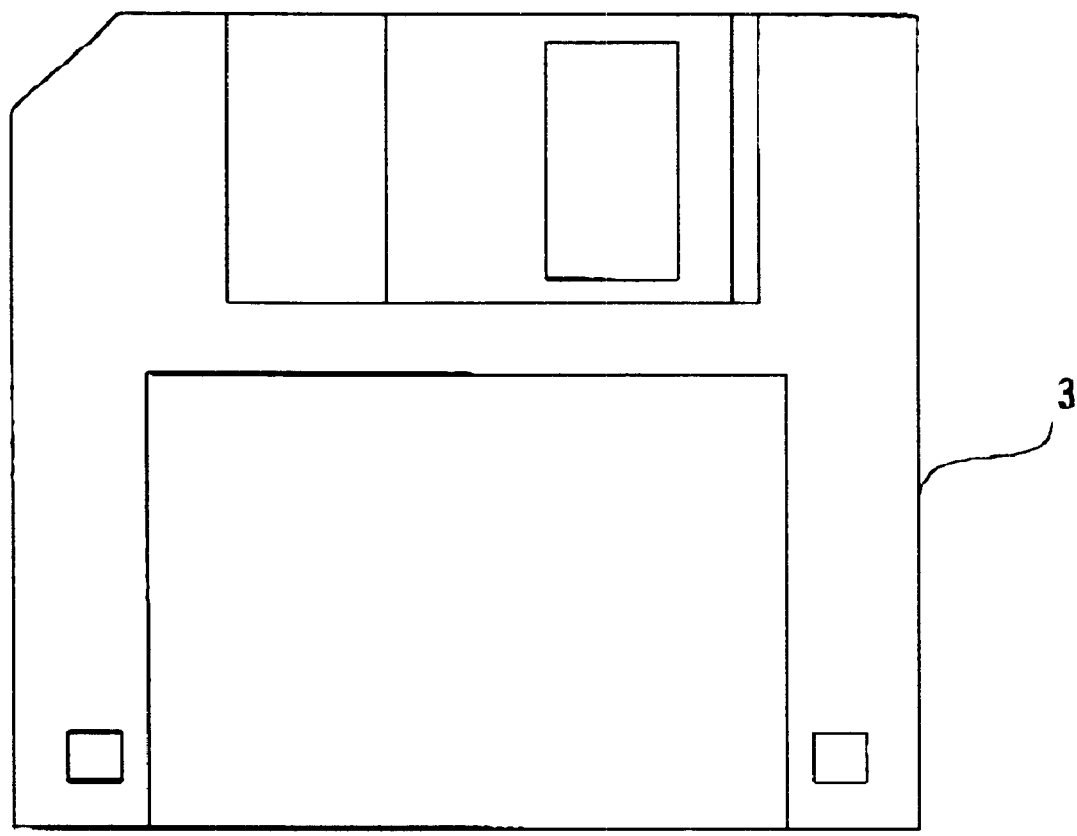
FIG. 6 is a diagram illustrating a floppy disk for storing a program for making a computer function as the memory card system according to the embodiment of the present invention.

FIG. 5 is a flowchart for explaining an initial process.

(Initial Process)

When the access device 2 is activated and the storage section 11 is installed in the slot 13 of the memory card 1, the CPU 121 included the controller 12 detects the installation of the storage section 11, and executes an initial process described in FIG. 5.

When the initial process begins, the CPU 121 supplies the storage section 11 with a command to acquire device ID data. The storage section 11 sends to the CPU 121 the device ID data in response to the command. The CPU 121 acquires such data sent from the storage section 11 (Step S11). The CPU 121 determines whether the acquired device ID data is proper data which represents the storage section 11 to be accessed by the CPU 121 (Step S12). When determined that the device ID data is proper data in Step S12, the flow advances to Step S13.

On the other hand, when determined that the device ID data is not proper data, the CPU 121 ends up the initial process, for the reason that a proper storage section 11 is not installed in the slot 13.

Once the initial process is ended up for the above reason, even if the access device 2 supplies the CPU 121 with a command, the CPU 121 does not receive any command until a proper storage section 11 is detected to be installed therein. Therefore, the CPU 121 does not substantially access the general data storage area included in the storage section 11, until detecting that a proper storage section 11 is installed in the slot 13.

In Step S13, the CPU 121 reads out from the ROM 122 certification data representing a particular piece of the CIS data. Further, the CPU 121 reads out the CIS data and the boot data from the head block included in the storage section 11, and stores the read data in the SRAM 123.

In Step S13, there is no need for the CPU 121 to read out the boot data in its entirety, which the storage section 11 stores. In this embodiment of the present invention, the CPU 121 is satisfactory, as long as it reads out the particular piece of data, which should substantially be corresponding to the certification data read from the ROM 122, of proper boot data stored in the storage section 11.

Then, the CPU 121 determines whether, of the boot data read out from the storage section 11, the particular piece of data, which is supposed to substantially correspond to the certification data, actually corresponds thereto (Step S14). In Step S14, it is determined whether the storage section 11 is controllable by the controller 12 or not.

In Step S14, if the particular piece of data is determined as not to correspond to the certification data, the CPU 121 ends up the process, for the reason that the storage section 11, which is controllable by the controller 12, is not installed in the slot 13.

On the contrary, when determined that the particular piece of data and the certification data correspond to each other, the CPU 121 reads out the boot data and the code key from the boot data storage area included in the storage section 11, and stores the read boot data and the code key in a corresponding storage area of the SRAM 123 (Step S15). Of storage areas included in the SRAM 123, the CPU 121 initializes a storage area in which the BPT and BSI are stored (Step S16).

In Step S16, the CPU 121 writes to each section for storing the BPT, of sections each corresponding to one word constituting the storage area of the SRAM 123, a value (e.g., the above value "07FFh") representing that no physical block address does correspond thereto. The CPU 121 resets as "0" the entire logic values of bits corresponding to an area of the storage section 11 in which the BSI is stored.

The CPU 121 specifies, of the blocks stored in the storage section 11, a block, to which the lowest physical block address is affixed, and whose LBA is not yet read out. The CPU 121 then reads out its LBA from the redundant section included in a corresponding page which belongs to the specified block (Step S17).

The CPU 121 writes the physical block address affixed to a block, whose LBA is read out, to a corresponding storage area of the SRAM 123, and to which an address conforming to the read LBA is affixed (Step S18). By doing this, updated data showing the correlation between the physical block address and the LBA is added into the BPT.

The CPU 121 determines whether the block, whose LBA is lastly read out in Step S17, is an empty block or not (Step S19). To be more specific, the CPU 121 determines whether a given empty block code is stored in the redundant section of a page included in the block.

When determined that the block is not an empty block, the flow advances to Step S21. On the other hand, when determined that the block is an empty block, the CPU 121 estimates in which position the bits corresponding to a physical block address affixed to the empty block are to be stored in storage area of the SRAM 123. Then, the CPU 121 renews the logical value of the bits in the estimated position as "1" (Step S20), and the flow advances to Step S21.

In addition to the above, in Step S21, the CPU 121 determines whether a block is present following the block whose LBA is read out in Step S17. When determined that such a block is present, the flow returns to Step S17. On the other hand, when determined that such a block is not present, the CPU 121 ends up the initial process.

In the above-described initial process, the certification data and the boot data are read out from the storage section 11 using the boot data itself, thereby to create the BSI and the BPT.

(Process for Reading General Data)

Upon completion of the initial process, the CPU 121 included in the memory card 1 receives from the access device 2 an instruction to access the storage section 11.

The access device 2, when instructing the CPU 121 to read general data from the storage section 11, supplies the CPU 121 with a command to read general data and with data for designating a storage area from which general data is read out. It should be noted that the command to read general data, in this case, is to instruct the CPU 121 to read general data in accordance with a process indicated by the boot data. The access device 2 may instruct the CPU 121 to send to the access device 2 the boot data or the code key, which are stored in the SRAM 123 in Step S15, thereby to receives such data or a code key therefrom.

The data for designating a storage area from which general data is read out, may be in the form of CHS (Cylinder-Head-Sector), for example. The data in the form of CHS represents a virtual storage area which corresponds to the boot data storage area and the general data storage area of the storage section 11 in size, the virtual storage area which is hierarchically divided into three sections of cylinder, head and sector. The access device 2 may acquire data representing the size of the storage areas of the storage section 11, with reference to the acquired boot data, for example.

The format of the data for designating a storage area from which general data is read out is arbitrary. For example, the data may be constituted by consecutive values, starting from 0, which are affixed to 512 sections respectively corresponding to 512 bytes of the virtual storage area which conforms to the storage area of the storage section 11 in size.

Upon reception of a command to read general data and data for designating a storage area from which the general data is read out, the CPU 121 transforms the data specifying the storage area into the following data (A) and (B).

That is, the CPU 121 creates:

(A) data representing to which block the specified storage area corresponds, the block being one to which an LBA is affixed, and which is included in either one of the storage areas of the storage sections 11; and (B) data representing to what page within the block, which is specified by the data (A), the specified storage area corresponds.

The number of blocks to be specified by the data (A) is not limited to 1, as well as the number of pages specified by the data (B).

The CPU 121 searches the BPT for a physical block address corresponding to the LBA specified by the data (A). Then, the CPU 121 specifies a page from which data is read out, in accordance with the searched physical block address and the above data (B), and reads out general data stored in the specified page.

The CPU 121 supplies the access device 2 with the read general data. Thereafter, the access device 2 decodes the supplied general data using the code key which has been read in Step S15 during the initial process.

According to the so-far explained process, any encoded general data is read out from the storage section 11 and is decoded.

(Process for Writing Data)

When transmitting an instruction to write data into the storage section 11, the access device 2 encodes the data to be written, using the code key which has been read out in Step S15.

Then, the access device 2 provides the CPU 121 with a command to write the encoded data to be written and general data and with data for designating a storage area into which the data is to be written. The command to write general data is an instruction to write such data in accordance with a process represented by the acquired boot data.

Upon reception of such command and data, the CPU 121 transforms the data for designating a storage area into the above data (A) and (B). The CPU 121 searches the BSI for a certain number of physical block addresses corresponding to empty blocks, the number being the same as the number of blocks specified by the data (A).

The CPU 121 searches the BPT for every physical block address corresponding to the LBA specified by the data (A). Then, the CPU 121 categorizes the pages included in every block the searched physical block address indicates, as a page (an appropriate page into which data can be written) specified by the data (B), or as any other page (an inappropriate page into which no data can be written).

In a case where there is searched, from the BPT, no physical block address corresponding to the physical block address specified by the data (A), the CPU 121 writes, into a block specified by the physical block address searched referring to the BSI, data to be written which is sent from the access device 2. Then, the CPU 121 so changes the data contents of the BSI that the block into which data is written is not specified as an empty block.

The CPU 121 writes into a storage area, where data indicating no physical block address corresponds to a LBA, within the BPT, a physical block address affixed to a block where data is newly written (i.e., the block which has more recently been updated). After the BSI and the BPT are both updated, the process is terminated.

In a case where there is searched, from the BPT, a physical address corresponding to the physical address specified with reference to the data (A), the CPU 121 set a block indicated by the searched physical block address and each block indicated by the data (A) in one-to-one correspondence to each other.

Then, the CPU 121 transfers the data contents from a page which belongs to the block specified by the data (A) into a certain page of a block corresponding to the block indicated thereby.

The CPU 121 transfers such data from the above page to a page which is sequentially arranged sequentially from the head of the block in the order identical with that of the page from which data is transferred. Instead of transferring the data contents from an appropriate page into which data is to be written, the CPU 121 writes, of the data which is sent form the access device 2 as those to be written, data to be written in the appropriate page.

Every time data is completely written into each empty block which is searched with reference to the BSI, the CPU 121 resets the block from which data is transferred and which corresponds to the empty block. Thereafter, the CPU 121 writes an empty block code into a redundant section of page which blocks to the reset block.

The CPU 121 overwrites a physical block address of a block, into which data is completely written, in a storage area, where the physical block address of the reset block is stored, within the updated BPT. By doing this, the LBA, which has been corresponding to the reset block, now corresponds to the block, into which data is completely written.

Furthermore, the CPU 121 so accesses the BSI as to change the data contents of the BSI. Particularly, the CPU 121 so changes the data contents of the BSI that the reset block is specified as an empty block, instead of the block, to which data is completely written, being specified as an empty block.

After the CPU 121 completes writing the data into any empty block which is searched with reference to the BSI, and updating the BSI and the BPT, the process for writing data is terminated.

According to the so-far described process, the data sent from the access device 2 is stored in the storage section 11. The data contents of the BSI are so updated in such a way that every single updated block is specified either as an empty block, into which no data is stored as a result of transferring data therefrom, or an updated block, into which data is written. The data contents of the BPT are also updated. To this end, the LBA which has been assigned to a block is newly assigned to a block into which data has been transferred from the above block, which then becomes an empty block.

(Process for Erasing Data)

In a case where to erase data at one time stored in each block within the storage section 11, the access device 2 supplies the CPU 121 with a command to erase such data and an LBA affixed to a block where data to be erased is stored.

Upon reception of the command and the LBA, the CPU 121 searches the BPT for a physical block address corresponding to the sent LBA. The CPU 121 resets a block which is specified by the searched physical block address. Then, the CPU 121 writes an empty block code into the redundant section of a page which belongs to the reset block.

The CPU 121 so updates the BSI that the reset block is specified as an empty block, thereafter the process is terminated.

According to the so-far described process, the data stored in the storage section 11 is erased in the unit of blocks. The data which had been stored in a block, which is now an empty block as a result of the erasing of data, is added to the BSI.

The memory card 1 may perform writing of data without going through any particular writing operations, for writing the data sent from the access device 2. In this structure, any data stored in an arbitrary storage area which is not necessarily expressed in the unit of blocks.

The structure of the memory card 1 is not limited to the above.

For example, the storage device of the storage section 11 may store device ID data. In addition, the controller 12 may have a function for updating the boot data and the device ID data, in accordance with a command sent from the access device 2.

In a case where a process for reading or writing the data specified by the acquired boot data is the only one which can be carried out by the controller 12 included in the memory card 1, the access device 2 does not necessarily supply the controller 12 with data representing a process for reading or writing data.

The controller 12 may determine, based on the boot data stored in the storage section 11 connected thereto, a process for reading data from the storage section 11 or a process for writing data to the storage section 11. Likely to the above, the access device 2 does not necessarily provide the controller 12, connected thereto, with the data representing a process for reading or writing data.

Included in the storage section 11 is not limited to an EEPROM, but also any other arbitrary types of storage device. The storage capacity of the storage section 11 or the data structure of the storage area are not limited to the above. For example, a logical position, in which the boot data, the code key or the CIS data is stored, within a storage area of the storage section 11 may be changed at any time. In this case, the storage section 11 or the controller 12 provides the access device 2 with data representing a logical position, in which the boot data, the code key or the CIS data is stored, thereafter the access device 2 may access the logical position specified by the supplied data.

The code key stored in the storage section 11 is not necessarily in a plaintext form, i.e., the code key can be encoded. In such a case, the CPU 121 may decode the code key, which is read out from the boot data storage area included the storage section 11 in Stop S15, and may store the decoded data in the storage area of the SRAM 123.

The storage system of this present invention is not limited to a dedicated system, and can be realized using an ordinary computer system. The storage system which executes the above-described process can be realized installing programs for carrying out the above-described process into computers, including the slot for installed the controller 12 therein, from any medium (a floppy disk, a CD-ROM, etc.) which stores the programs. In the case where the aforementioned processes are executed through utilization of any OS or a combination of an OS and an application, software other than the OS may only be stored on the medium.

For example, the programs may be presented on the bulletin board of the communications network and may be supplied to the computers via the network.

Figure 7:
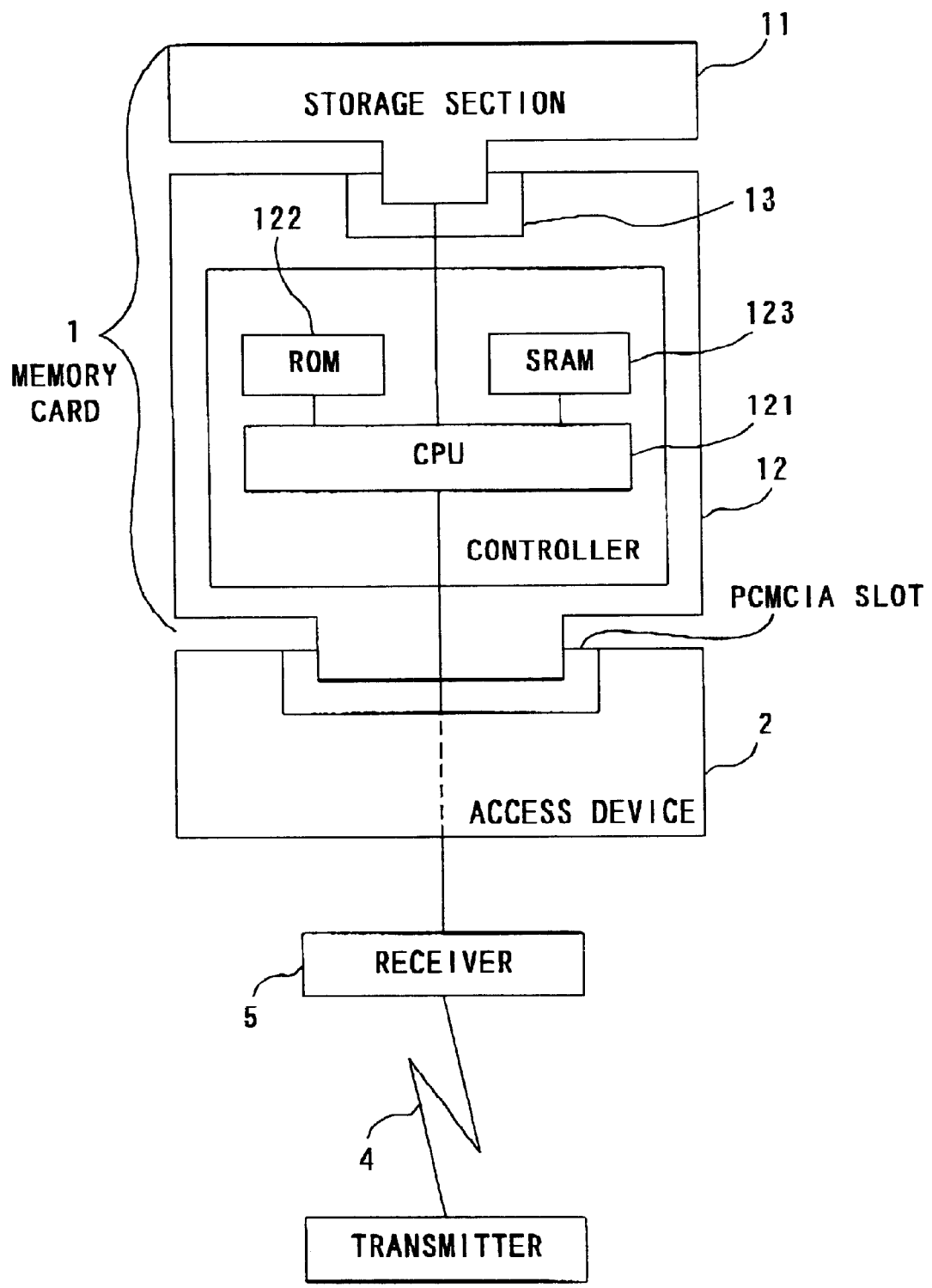
FIG. 7 is a diagram illustrating the structure, in which a program for making a computer execute the memory card system according to the embodiment of the present invention is transmitted via a carrier wave.

As shown in FIG. 7, a modulation wave 4 in which a carrier wave has been modulated using a signal representing the programs may be transmitted via a receiver 5 to computers which have a function as the access device 2 or the controller 12.

Then, the above programs are activated and executed under the control of the OS so as to carry out the above-described processes, as well as other application programs.

In a case where a part of the above processes is assigned to the OS or where the OS is included in the present invention as a component part thereof, programs excluding that part of the OS may stored on the medium. In this case, programs for executing functions or steps to be carried out by the computer are stored on the storage medium.

As explained, according to the present invention, the storage system, the storage device, the storage medium controller, the access device and the method for protecting data can be realized, to that stored data is so encoded as to be protected and that the data can be accessed in accordance with an easy process.

Various embodiments and changes may be made thereonto without departing from the broad spirit and scope of the invention. The above-described embodiments intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H11-54725 filed on Mar 2, 1999 and including specification, claims, drawings and summary. The disclosure of the above Japanese Patent Application is incorporated herein by reference in its entirety.

What is claimed is:

1. A storage system comprising:
   a storage medium and an access device, and
   wherein said storage medium includes a storage area for storing:
      code data representing encoded data,
      a code key for use in decoding the code data and in creating the code data, and
      boot data representing in a plaintext form a condition to access said storage medium, and
   said access device:
      obtains the boot data and the code key from said storage medium,
      obtains the code data from said storage medium, in accordance with the condition represented by the obtained boot data, and decodes the obtained code data using the obtained code key, and
      creates code data by encoding data to be stored on said storage medium with the obtained code key, and stores the created code data on said storage medium in accordance with the condition represented by the boot data.

2. The storage system according to claim 1, wherein said storage medium so stores the code key and the boot data as not to substantially be rewritten.

3. The storage system according to claim 1, further comprising a storage medium controller which controls said storage medium to be removably installed in said controller and which is removably installed in said access device, wherein:
   said storage medium controller
      obtains the code data from said storage medium, and provides the access device with the obtained code data, in response to a read instruction which is sent from said access device, and
      obtains from said access device the code data which said access device has created, and stores the code data on said storage medium in response to a write instruction, which is sent from said access device; and
   said access device
      provides said storage medium controller with the read instruction to obtain the code data from said storage medium in accordance with the condition represented by the boot data, and
      requests said storage medium controller for storing on said storage medium the created code data in accordance with the condition represented by the boot data.

4. The storage system according to claim 3, wherein said storage medium controller stores certification data specifying at least one piece of proper boot data, determines whether the stored certification data coincides with the boot data stored on said storage medium, and, when determined that the stored certification data does not coincides therewith, substantially rejects the read and write instructions sent from the access device.

5. The storage system according to claim 3, wherein:
   said storage medium stores ID data for identifying itself; and
   said storage medium controller determines whether said storage medium is a proper medium based on the ID data supplied from said storage medium, and, when determined that said storage medium is not a proper medium, substantially rejects the read and write instructions sent form the access device.

6. The storage system according to claim 4, wherein said storage medium so stores the ID data substantially as not be rewritten.

7. A storage device storing code data representing encoded data, a code key for use in decoding the code data and in creating the code data, and boot data showing in a plaintext form a condition to access the storage device, wherein said device
   sends the code data to an external device which obtains the boot data and the code key from the storage device and which requests for reading the code data in accordance with the condition represented by the boot data;
   obtains, from the external device which obtains the boot data and the code key from the storage device and which requests for writing the code data in accordance with the condition represented by the boot data, data to be written and stores the data.

8. The storage device according to claim 7, wherein said device so stores the code key and the boot data substantially so as not be rewritten.

9. The storage device according to claim 7, wherein said device stores ID data for identifying itself, and supplies, with the ID data, the external device which requests for reading and/or writing the code data.

10. The storage device according to claim 9, wherein said device so stores the ID data substantially as not to be written.

11. A storage medium controller,
which is removably installed in a storage medium having a storage area for storing:
ID data for identifying said storage medium,
code data representing encoded data,
a code key for use in decoding the code data and in creating the code data, and
boot data representing in a plaintext form a condition to access the storage medium, and
which is removably installed in an access device which
obtains the boot data and the code key from said storage medium,
obtains the code data from said storage medium in accordance with the condition represented by the obtained boot data,
decodes the obtained code data using the obtained code key,
creates code data by encoding to be written on said storage medium with the obtained code key, and
stores on said storage medium the created code data in accordance with the condition represented by the obtained boot data, and said controller comprising:
an output circuit which obtains the code data from said storage medium and supplies said access device with the obtained data, in response to a read instruction, which is supplied from said access device, to obtain the code data from said storage medium in accordance with the condition represented by the boot data,
an input circuit which obtains from said access device the code data created by said access device and which stores the code data on said storage medium in response to a write instruction, which is supplied from said access device, to store on the storage medium the code data created by said access device in accordance with the condition represented by the boot data; and
a determination circuit which determines whether said storage medium is a proper medium based on the ID data supplied from said storage medium, and, when determined that said storage medium is not a proper medium, substantially prevents said output and input circuits to respond to the read and write instructions.

12. A storage medium controller
which is removably installed in a storage medium including a storage area for storing
code data representing encoded data,
a code key for use in decoding the code data and creating the code data, and
boot data representing in a plaintext form a condition to access the storage medium, and
which is removably installed in an access device which
obtains the boot data and the code key from said storage medium,
obtains the code data from said storage medium in accordance with the condition which the obtained boot data represents,
decodes the obtained code data using the obtained code key,
creates code data by encoding data to be stored on said storage medium using the obtained code key, and
stores the created code data on said storage medium in accordance with the condition which the boot data represents, and said controller comprising:
a memory which stores certification data representing at least one piece of proper boot data; and
a control switch which
obtains the code data from said storage medium and supplies said access device with the obtained code data, in response to a read instruction, which is supplied from said access device, to obtain the code data from said storage medium in accordance with the condition which the boot data represents,
obtains from said access device the code data created by said access device, in response to a write instruction, which is sent form said access device, to write the created code data on said storage medium in accordance with the condition which the boot data represents,
stores the code data on said storage medium in response to the write instruction, and
determines whether the stored certification data coincides with the boot data stored on said storage medium, and
rejects the read and write instructions sent from said access device, when determined that the stored certification data does not coincide with the boot data stored on said storage medium.

13. An access device comprising:
an input device which obtains boot data and a code key from a storage medium including a storage area for storing
code data representing encoded data,
a code key for use in decoding the code data and in creating the code data, and
boot data representing in a plaintext form a condition to access the storage medium;
a decoder which obtains the code data from said storage medium in accordance with the condition which the obtained boot data represents, and which decodes the code data using the obtained code key; and
an encoder which creates code data by encoding data to be stored on said storage medium using the obtained code key, and which stores the created code data on said storage medium in accordance with the condition which the obtained boot data represents.

14. A method for protecting data, comprising the steps of:
obtaining boot data and a code key which are stored on a storage medium storing the boot data representing, in a plaintext form,
code data representing encoded data,
the code key for use in decoding the code data and in creating the code data, and
a condition to access the code data and the code key;
obtaining the code in accordance with the condition which the obtained boot data represents, and decoding the obtained code data using the obtained code key; and
creating code data by encoding data to be stored with utilization of the code key; and storing on said storage medium the erased code data in accordance with the condition which the boot data represents.

15. The method for protecting data according to claim 14, wherein said storage medium is to store ID data for identifying the storage medium, said method comprising:
determining whether said storage medium is a proper medium based on the ID data, and substantially rejecting, when determined that said storage medium is not a proper medium, to obtain the code data from said storage medium and to store the code data on said storage medium.

16. The method for protecting data according to claim 14, comprising the steps of:
    storing certification data representing at least one piece of proper boot data; and
    determining whether the certification data coincides with the boot data stored on said storage medium, and substantially rejecting, when determined that the certification data does not coincide therewith, to obtain the code data from said storage medium and to store the code data on said storage medium.

17. A computer readable storage medium which stores a program for controlling a computer,
    which is removably installed in a storage medium including a storage area for storing ID data for identifying the storage medium, code data representing encoded data, a code key for use in decoding the code data and in creating the code data, and boot data representing a condition to access the storage medium, and
    which is removably installed in an access device, which
        obtains the boot data and the code key from said storage medium,
        obtains the code data from said storage medium in accordance with the condition represented by the obtained boot data,
        decodes the obtained code data using the obtained code key,
        creates code data by encoding data to be stored on said storage medium with utilization of the obtained code key, and
        stores the created code data on said storage medium in accordance with the condition represented by the obtained boot data, and the program controlling the computer to function as:
            an output circuit which obtains the code data from said storage medium and supplies said access device with the obtained code data, in response to a read instruction, which is sent from said access device, to obtain the code data from said storage medium in accordance with the condition represented by the boot data;
            an input device which obtains from said access device the code data created by said access device, in response to a write instruction, which is sent from said access device, to store the created code data on the storage medium in accordance with the condition represented by the boot data, and which stores the code data on the storage medium in response to the write instruction; and
        a determination circuit which determines whether the storage medium is a proper medium based on the ID data sent from said storage medium, and, when determined that the storage medium is not a proper medium, substantially prevents said output and input circuits to respond to the read and write instructions.

18. A computer data signal embodied in a carrier wave and representing a program for controlling a computer,
    which is removably installed in a storage medium including a storage area for storing
        ID data for identifying the storage medium,
        code data representing encoded data,
        a code key for use in decoding the code data and in creating the code data, and
        bond data representing in a plaintext form a condition to access the storage medium, and
    which is removably installed in an access device which
        obtains the boot data and the code key from said storage medium,
        obtains the code data from said storage medium in accordance with the condition represented by the obtained boot data,
        decodes the obtained code data using the obtained code key,
        creates code data by encoding data to be stored on said storage medium with utilization of the obtained code key, and
        stores the created code data on said storage medium in accordance with the condition represented by the obtained boot data, and the program controlling the computer to function as:
            an output circuit which obtains the code data from said storage medium and supplies said access device with the obtained code data, in response to a read instruction, which is sent from said access device, to obtain the code data from said storage medium in accordance with the condition represented by the boot data;
            an input circuit which obtains from said access device the code data created by said access device, when said access device supplies said input device with a write instruction to store the created code data on said storage medium in accordance with the condition represented by the boot data, and which stores the obtained code data on said storage medium in response to the write instruction; and
            a determination circuit which determines whether said storage medium is a proper medium based on the ID data sent from said storage medium, and, when determined that said storage medium is not a proper medium, substantially prevents said input and output circuits to respond to the read and write instructions.

19. A computer readable storage medium storing a program for controlling a computer,
    which is removably installed in a storage medium including a storage area for storing
        code data representing encoded data,
        a code key for use in decoding the code data and in creating the code data, and
        boot data representing a plaintext form a condition to access the storage medium, and
    which is removably installed in an access device which
        obtains the boot data and the code key from said storage medium,
        obtains the code data from said storage information in accordance with the condition represented by the boot data,
        decodes the obtained code data with utilization of the obtained code key,
        creates code data by encoding data to be stored on said storage medium with utilization of the obtained code key, and
        stores the created code data on said storage medium in accordance with the condition represented by the boot data, and the program controlling the computer to function as:
            a memory which stores certification data representing at least one piece of proper boot data; and
            a controller circuit which obtains the code data from said storage medium and supplies said access device with the obtained code data, in response to a read instruction, which is sent from said access device, to obtain the code data from said storage medium in accordance with the condition represented by the boot data, obtains from said access device the code data created by said access device, when said access device supplies the controller with a write instruction to store the created code data on said storage medium in accordance with the condition represented by the boot data, stores the code data on the said storage medium in response to the write instruction, and substantially rejects the read and write instructions from said access device when determined that the certification data does not coincides with the boot data stored on said storage medium.

20. A computer data signal embodied in a carrier wave and representing a program for controlling a computer, which is removably installed in a storage medium including a storage area for storing
code data representing encoded data,
a code key for use in decoding the code data and in creating the coded data, and
boot data representing in a plaintext form a condition to access the storage medium, and which is removably installed in an access device which obtains the boot data and the code key from said storage medium,
obtains the code data from said storage medium in accordance with the condition represented by the obtained boot data,
decodes the obtained code data using the obtained code key,
creates code data by encoding data to be stored on said storage medium with utilization of the obtained code key, and
stores the created code data on said storage medium in accordance with the condition represented by the boot data, and the program for controlling the computer to function as:
a memory which stores certification data representing at least one piece of proper boot data; and
a control circuit which obtains the code data from said storage medium and supplies said access device with the obtained code data, in response to a read instruction, which is sent from said access device, to obtain the code data from said storage medium in accordance with the condition represented by the boot data, obtains from said access device the code data created by said access device, when said access supplies the control circuit with a write instruction to store the created code data on said storage medium in accordance with the condition represented by the boot data, stores the code data on said storage medium in response to the write instruction; and substantially rejects, when determined that the certification data does not coincides with the boot data stored on said storage medium, the read and write instructions sent from said access device.

21. A computer readable storage medium which stores a program for controlling a computer which is connected to a storage medium including a storage area for storing code data represented encoded data, a code key for use in decoding the code data and in creating the code data, and boot data representing in a plaintext form a condition to access the storage medium, and the program making the computer function as:
an input device which obtains the boot data and the code key from said storage medium;
a decoder which obtains the code data from said storage medium in accordance with the condition represented by the obtained boot data, and which decodes the obtained code data using the obtained code key; and
an encoder which creates code data by encoding data to be stored on said storage medium with utilization of the obtained code key, and which stores the created code data on said storage medium in accordance with the condition represented by the boot data.

22. A computer data signal embodied in a carrier wave and representing a program for controlling a computer which is connected to a storage medium including a storage area for storing
code data representing encoded data,
a code key for use in decoding the code data and in creating the code data, and
boot data representing in a plaintext form a condition to access the storage medium, the program making the computer function as:
an input device which obtains the boot data and the code key from said storage medium;
a decoder which obtains the code data from said storage medium in accordance with the condition represented by the obtained boot data, and which decodes the obtained code data using the obtained code key; and
an encoder which creates code key data by encoding data to be stored on said storage medium with utilization of the obtained code key, and which stores the created code data on said storage medium in accordance with the condition represented by the obtained boot data.

* * * * *